(12) United States Patent
Scopes et al.

(10) Patent No.: US 8,992,125 B2
(45) Date of Patent: Mar. 31, 2015

(54) TRENCHLESS DUCTING APPARATUS FRAME

(75) Inventors: Mark Edward Scopes, Ipswich (GB); Christopher Nigel Munnings, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 17 days.

(21) Appl. No.: 13/143,063

(22) PCT Filed: Dec. 24, 2009

(86) PCT No.: PCT/GB2009/002966
§ 371 (c)(1),
(2), (4) Date: Jun. 30, 2011

(87) PCT Pub. No.: WO2010/092315
PCT Pub. Date: Aug. 19, 2010

(65) Prior Publication Data
US 2011/0274500 A1   Nov. 10, 2011

(30) Foreign Application Priority Data
Dec. 31, 2008 (GB) .................................. 0823725.7

(51) Int. Cl.
*F16L 1/00* (2006.01)
*E02F 5/10* (2006.01)
*F16L 1/06* (2006.01)
(Continued)

(52) U.S. Cl.
CPC . *F16L 1/06* (2013.01); *E21B 7/046* (2013.01); *E21B 7/205* (2013.01); *E21B 19/087* (2013.01); *E21B 33/038* (2013.01); *F16L 1/026* (2013.01)

USPC ............ 405/184; 254/134.3 FT; 254/134.3 R

(58) Field of Classification Search
CPC ..... E21B 7/205; E21B 11/005; E21B 19/087; E21B 7/046; F16L 1/00
USPC .............................. 405/174, 177, 184, 184.4; 254/134.3 FT, 134.3 R
See application file for complete search history.

(56) References Cited

U.S. PATENT DOCUMENTS

| | | | |
|---|---|---|---|
| 826,329 A | 7/1906 | Grabiel | |
| 1,188,336 A | 6/1916 | Shurtleff | |

(Continued)

FOREIGN PATENT DOCUMENTS

| | | | |
|---|---|---|---|
| EP | 0 108 590 A1 | 5/1984 | |
| EP | 1 273 902 A2 | 1/2003 | |

(Continued)

OTHER PUBLICATIONS

International Search Report for International Application No. PCT/GB2009/002969 dated May 4, 2010.

(Continued)

*Primary Examiner* — Doug Hutton, Jr.
*Assistant Examiner* — Stacy Warren
(74) *Attorney, Agent, or Firm* — Patterson Thuente Pedersen, P.A.

(57) ABSTRACT

An apparatus for moving an elongate component within or through one of a plurality of sidewalls of a pit, including a gripping arrangement for releasably gripping the elongate component, a lever arm comprising a handle at a first end and the gripping arrangement at the second end, and a frame to which the lever arm is attached, wherein during use the frame is positioned substantially above the pit, and the gripping arrangement hangs downwardly from the frame into the pit.

9 Claims, 4 Drawing Sheets

(51) Int. Cl.
*E21B 7/04* (2006.01)
*E21B 7/20* (2006.01)
*E21B 19/087* (2006.01)
*E21B 33/038* (2006.01)
*F16L 1/026* (2006.01)

(56) References Cited

U.S. PATENT DOCUMENTS

| | | | |
|---|---|---|---|
| 1,208,472 A | | 12/1916 | Brown |
| 1,523,175 A | * | 1/1925 | Cross et al. .................. 15/104.33 |
| 2,056,489 A | | 10/1936 | Scott et al. |
| 2,349,033 A | | 5/1944 | Elliott |
| 2,519,680 A | | 8/1950 | Macumber |
| 2,612,343 A | | 9/1952 | Fraizer et al. |
| 2,718,804 A | | 9/1955 | Dannheim |
| 2,789,789 A | | 4/1957 | Lea, Jr. |
| 2,882,011 A | | 4/1959 | Ripstein |
| 3,244,292 A | * | 4/1966 | Elliott ............................ 212/300 |
| 3,595,526 A | | 7/1971 | Faver |
| 3,645,502 A | | 2/1972 | Stromp, Jr. |
| 3,807,695 A | * | 4/1974 | Gremillion et al. .......... 254/29 R |
| 3,907,253 A | | 9/1975 | Schosek |
| 3,945,608 A | | 3/1976 | Somerville et al. |
| 3,966,169 A | * | 6/1976 | Schosek ....................... 254/29 R |
| 3,988,003 A | * | 10/1976 | Schosek ....................... 254/29 R |
| 3,988,004 A | * | 10/1976 | Schosek ....................... 254/29 R |
| 4,251,058 A | | 2/1981 | Schosek |
| 4,362,435 A | * | 12/1982 | Henry ........................ 405/184.5 |
| 4,368,873 A | * | 1/1983 | Perry ........................... 254/29 R |
| 4,750,711 A | | 6/1988 | Landry |
| 5,232,205 A | * | 8/1993 | McVaugh ................. 254/134.3 R |
| 5,328,297 A | * | 7/1994 | Handford ....................... 405/184 |
| 6,086,050 A | * | 7/2000 | Wiederkehr et al. .......... 254/266 |
| 2005/0111919 A1 | * | 5/2005 | Wentworth et al. ......... 405/184.3 |
| 2011/0272652 A1 | | 11/2011 | Scopes et al. |
| 2011/0274499 A1 | | 11/2011 | Scopes et al. |

FOREIGN PATENT DOCUMENTS

| | | |
|---|---|---|
| EP | 1 832 903 A1 | 9/2007 |
| EP | 1 832 908 A1 | 9/2007 |
| GB | 2 219 662 A | 12/1989 |
| JP | 2006299755 | 11/2006 |
| NL | 9100211 | 9/1992 |
| SU | 1 000 750 A1 | 2/1983 |

OTHER PUBLICATIONS

International Search Report for International Application No. PCT/GB2009/002965 dated May 3, 2010.

Application and File History for U.S. Appl. No. 13/143,057 filed Jun. 30, 2011, inventors Scopes et al.

Application and File History for U.S. Appl. No. 13/143,060 filed Jun. 30, 2011, inventors Scopes et al.

Application No. 09785122.4, European Communication mailed Mar. 27, 2014, 5 pages.

Nasa, *Bernoulli's Equation*, 3 pages, dated Mar. 11, 2014.

* cited by examiner

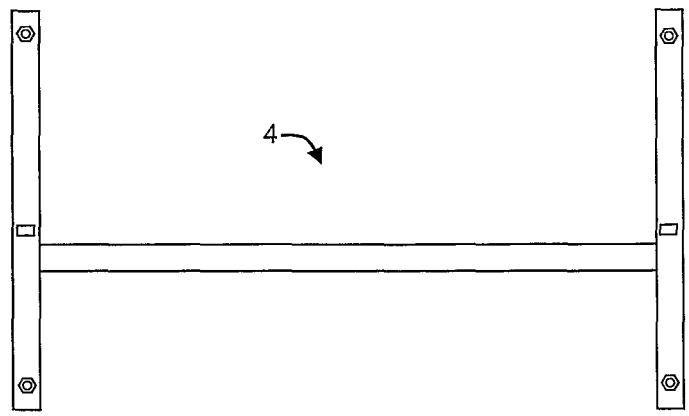
FIGURE 2A
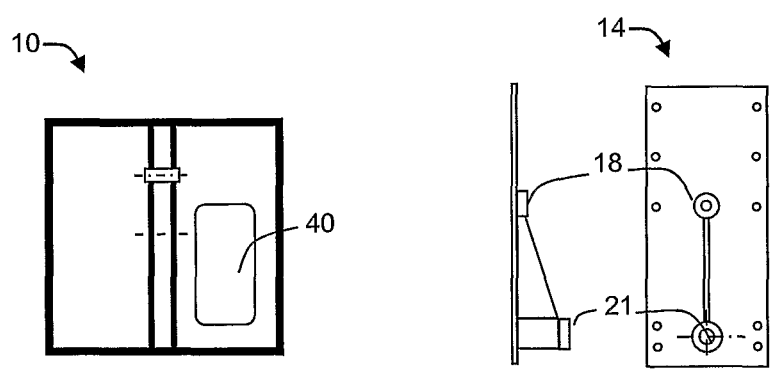
FIGURE 2B
FIGURE 2C

TRENCHLESS DUCTING APPARATUS FRAME

RELATED APPLICATIONS

The present application is a National Phase entry of PCT Application No. PCT/GB2009/002966, filed Dec. 24, 2009, which claims priority from Great Britain Patent Application No. 0823725.7, filed Dec. 31, 2008, the disclosures of which are hereby incorporated by reference herein in their entirety.

TECHNICAL FIELD

The invention relates to apparatus and methods relating to the trenchless installation of subterranean infrastructure using pushing methods, particularly but not limited to the installation of underground utilities piping or cabling.

BACKGROUND

As suggested by its name (sometimes also referred to as "no dig"), trenchless methods obviate the need to dig a substantially continuous trench or channel along the entire path to be taken by the underground tube or cable. Use of these methods reduces the extent of surface, underground and environmental disruption.

Trenchless methods involve the initial excavation of one or more ditches or pits, into which is lowered machinery and equipment, which forms a horizontal direction bore through a sidewall or bank of the pit at the required depth. Alternatively, the piping or such article to be installed is directly and forcibly pushed in the horizontal direction into the ground through a pit wall. Examples of trenchless methods that are hydraulic pipe ramming, moling using percussive heads, guided drilling techniques, and the like.

In the field of telecommunications, ever-greater deployment of optical fiber in the networks has now penetrated to the access network or local loop, i.e., the "last mile" in the path between the local exchange and customer premises. Optical fiber can be provided to various points along the path from the local exchange into customer premises, e.g., to the cabinet, the curb, and the premises or home (FTTH).

Typically, the market for FTTH connections is commercial or industrial in nature, which customers are relatively few in number and who are paying commercial rates for the installation of their optical lines. The provision of a similar connection to the vastly greater numbers of private, non-commercial premises throughout the country is an undertaking on a huge scale involving the installation of vast amounts of optical fiber at the local access level which had previously been served by copper.

In one FTTH implementation, blown fiber is deployed. This method is described in, e.g., EP 108590, where two points are optically connected in a two-stage process. First, a blown fiber tube is initially provisioned along the path between the two points. Subsequently, as and when the optical connection is required, a fiber or fiber unit (comprising a number of individual fibers) is installed through the waiting fiber tube, by "blowing" it through the tube, whereby the fiber or fiber unit is pulled along through the tube by the effects of viscous drag.

Various types of tubing or ducting for blown fiber use exist. Mini- or micro-ducts are one type of blown fiber duct which is used particularly nearer the customer end in the access network. For a FTTH application, a number of micro-ducts are initially bundled into a larger duct at the exchange end, and gradually broken out along the path in a branching formation in the direction of the customer. These micro-ducts are hollow tubes typically made from plastics and range in size from 6 to 22 mm in OD diameter.

Currently, blown fiber tubes are installed within pre-installed duct or by direct burial either by surface-digging trenches which extend the length of the installation, which is then reinstated after the tubing has been laid. It is possible to cut a slot into the ground which is substantially narrower than a standard trench, which reduces surface disruption, but this method requires specialized cutting equipment. Trenchless methods are also deployed, using commercial pipe ramming, moling and such-like commercial equipment. As can be expected, both surface and trenchless methods currently in use can generate considerable disturbance either on the ground surface level and/or in the amount of noise, fumes, congestion and the like the installation process creates.

One response to the need for less disruptive duct installation methods is to use manually-driven pushers or borers which do not employ heavy equipment or noisy percussive hammers or rammers with all the associated pollution and disruption. Such pushers are described in U.S. Pat. No. 1,188,336, U.S. Pat. No. 1,208,472, U.S. Pat. No. 2,519,680 and U.S. Pat. No. 3,645,502, wherein the apparatus is set on the floor of a trench or pit. The operative stands within the trench and operates a handle or lever arm to move (by pushing or pulling) a pipe or ducting through a pit sidewall and/or through the ground and in a horizontal or sideways direction into the ground. A pipe-engaging section located at the lower end of a lever arm engages with the pipe as the lever arm is operated by swinging it about a pivot or fulcrum so that its lower end describes an arc. This repeated action drives the pipe into the pit wall and thus into the ground. In use, the pipe-engaging section grips the pipe and pushes it forward on a pull stroke of the handle, and then releases it on the push stroke to allow the re-engagement with another section of the pipe. These pushers include the use of guides (e.g., plates) to ensure that the trajectory taken by the pipe does not veer too far off course while it is pushed through the ground, which is a result of the tendency of the pipe-engaging sections to send the pipe along a curved trajectory resulting from the curved path described with the swinging of the lever arm. Withdrawal of installed pipes is also provided for, by the reconfiguration of parts making up the pipe-engagement section, or else providing that the frame is capable of being taken apart so that the pushing apparatus may be taken out of the pit and positioned to face the opposite way.

Such pushing apparatus are not optimized for use in the installation of FTTH optical fiber ducting on the scale described above for various reasons. For example, the pits occupied by the prior art apparatus are relatively large, as having to accommodate the apparatus as well as the operative within it. With potentially so many pits to be dug at the customer end, any reduction in disruption would be desirable. This is so especially as residential customers may be less tolerant than, e.g., commercial customers of having their established gardens, driveways and private property torn up with an excessively large pit. It would also be advantageous to reduce the number of parts in the apparatus, to minimize exposure to the dirt and debris that may be expected in a pit.

Further, the pipe-engaging portions described in the prior art impart a high degree of crushing force when gripping the tube to push it forward. While metal pipes or solid boring rods may be able to withstand such forces, hollow mild steel push tubes and micro-duct tubes (usually made from plastics), may be more fragile and need greater care in handling. It would also be desirable to quickly and easily reconfigure the pushing apparatus to change its pushing direction for the withdrawal of pipes from the ground, without need for the operative to turn the entire device around completely, or to rearrange relatively small components with possibly gloved frozen fingers while standing in a dark cold wet ditch.

It would therefore be desirable to provide apparatus and methods addressing the above issues for the trenchless installation of micro-ducts and such other piping or tubing especially to accommodate FTTH telecommunications cables and fibers.

SUMMARY

According to an embodiment, there is provided an apparatus for moving an elongate component within or through one of a plurality of sidewalls of a pit, comprising a gripping arrangement for releasably gripping the elongate component, a lever arm comprising a handle at a first end and the gripping arrangement at the second end, and a frame to which the lever arm is attached, wherein during use the frame is positioned substantially above the pit, and the gripping arrangement hangs downwardly from the frame into the pit.

Embodiments of the apparatus address the need for reduced surface disruption and disturbance, by the use of a hanging arrangement wherein the gripping clamps which engage with the elongate pushing tube or rod. By relocating the gripping arrangement, the pit can be reduced. This is because room for neither the apparatus nor the operative is needed; all that is required is enough room to swing the lever arm about within the pit and for the operative to attach the push tube sections. The gripping arrangement located at the lower end of the lever arm can be positioned at the desired depth within the pit, and this depth can be more accurately measured by reference to the surface ground level—which is likely to be a better reference point than the pit floor or sidewalls which may not be level and/or may be imprecisely measured for depth (floor) or verticality (walls).

In embodiments, the apparatus is secured in its position relative to the pit and pit mouth by use of securing plates which are pushed using tensioned arms against the sidewalls. In one embodiment, two securing pressure plates are used against opposite sidewalls in the direction of the reciprocating action of the lever arm swing during use.

According to another embodiment, there is provided a system for moving an elongate component within or through a sidewall of a pit, comprising an apparatus of the invention secured into position substantially over a pit using the frame securing arrangement.

Methods using the apparatus of the invention to push in and to pull out elongate tubes and rods or the like to and from the sidewalls of the pit are also provided.

BRIEF DESCRIPTION OF THE DRAWINGS

Embodiments of the invention will now be described, by way of example only, with reference to the accompanying drawings, in which:

FIGS. 2A to 2C depict detailed views of certain components of the duct pushing apparatus.

DETAILED DESCRIPTION

Figure 1:
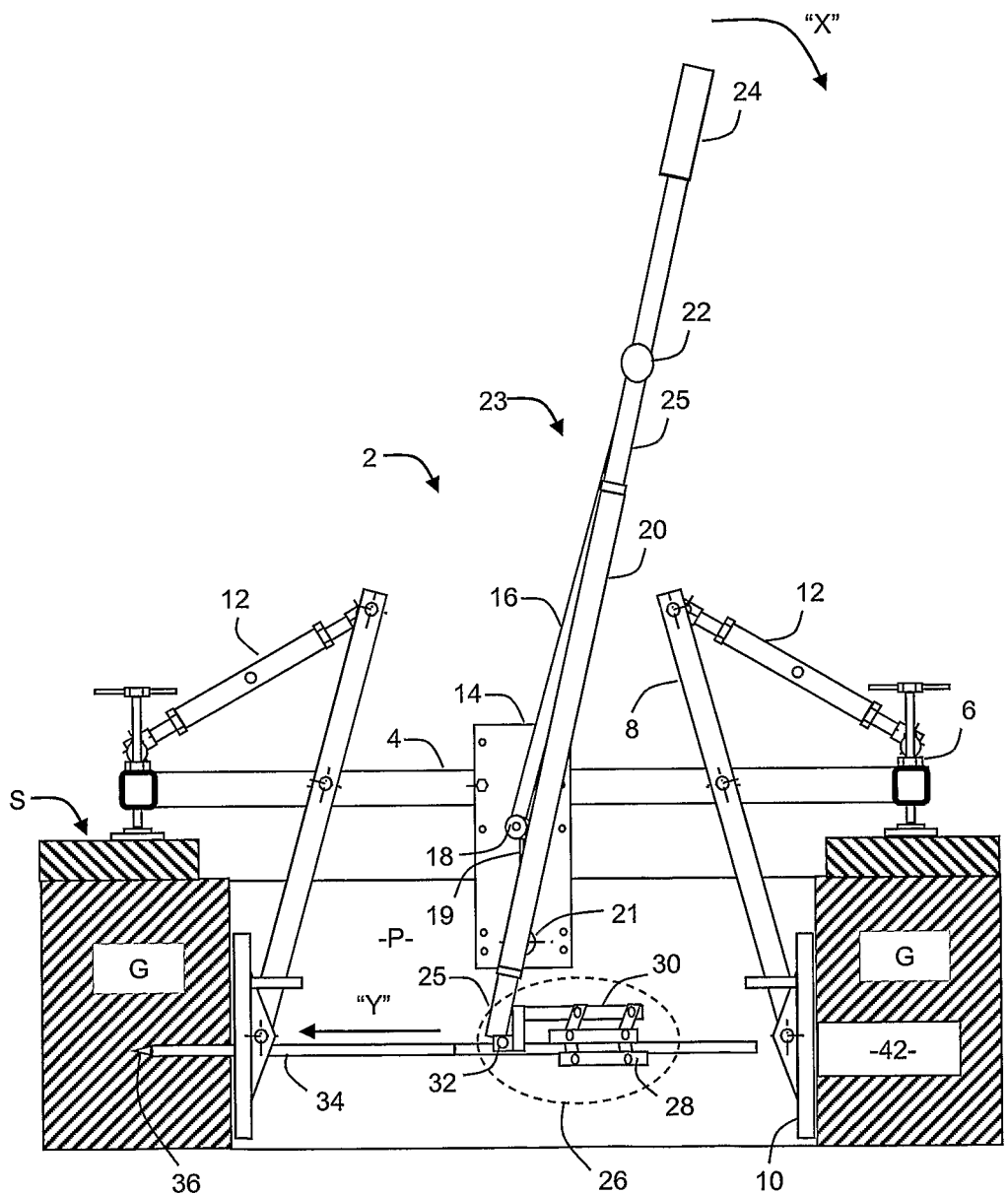
FIG. 1 is a side view of a duct pushing apparatus according to an embodiment.

FIG. 1 shows an embodiment of a duct or rod pushing apparatus (2) installed in a pit (P) dug into the ground (G). The pit comprises, in the main, of a floor and the surrounding sidewalls (which are typically but not always substantially vertical relative to the ground surface level) leading down from the ground surface level to the floor pit. The sidewall usually comprises a substantially continuous surface defining the side of the pit and can include corners and angles; the term "sidewall" and the like shall however in the present context refer to the "different" walls which are facing different directions within the pit.

The apparatus comprises a frame (4) (which is shown in isolation in plan view in FIG. 2A). A set of struts or supports (6) is provided at each end of the frame. In use, the apparatus is secured into position with a set of arms or legs (8) each terminating in a pressure plate (10) which is resiliently urged against the bank or the sidewall of the pit by a cable tensioners (12) connecting the arms to the frame (4). As shown in FIG. 1, the frame can be set up to "suspend" or "hover" over a pit which mouth, at least, is smaller than the width and/or length of the frame of the apparatus.

The skilled person would appreciate that the installation apparatus (2) can be suspended over the pit in a number of ways. For example, the apparatus can be supported over the pit on a set of spikes driven into the ground. However, use of the pressure plates to secure the frame in its position over the pit confers a number of advantages. For example, driving spikes into the ground to support the apparatus may harm other service pipes and cables when they are hammered into the ground. Spikes also offer less support during use due to the rocking motion of the entire set up resulting from the operative's swinging the main lever (23) imparting force to the push rod or tube (34) during use.

The embodiment shown in FIG. 1 uses pressure plates which face away from each other and are urged against sidewalls which are located opposite to each other. The skilled person would appreciate that there are various ways to mount the pressure plates, which are relatively thin flat metal sheets, under tension against the walls of the pit. In the simplest configuration, the plates can be simply pushed up against their respective walls by wedging the ends of a rod, arm or the between the backs of the plates so that to place it under tension between the plates within the pit. In this way, each plate is pushed up against its respective wall. The rod can be rigid or resilient in nature, as long as it is capable of maintaining the pushing force in both directions so that the plates at each end are held up against the sidewall faces. The frame can then be mounted on the top of the securing rod(s) and over the pit mouth.

In the embodiment of FIG. 1, the apparatus is positioned over the open pit mouth by placing the frame in the desired position. It is then secured in its position relative to the pit mouth to reduce or prevent movement during use, by using a securing arm to push a pressure plate, which is located at the end of the securing arm against a sidewall. The securing arm is placed under tension during use when urging the plate against its sidewall, and the level of tension can be advantageously adjusted by releasing and tightening the securing arm as necessary. In the embodiment shown in FIG. 1, the arm comprises an arrangement of arms (8) and cable tensioners (12). At least one of these components (in the embodiment, the cable tensioners) is adjustable along its length so that in use they cooperate to push the pressure securing plate (10) against its sidewall. Further, or alternatively, the length of one or more components within the securing arm may be controllably adjustable to fit the size of the pit to ensure that the plate at its end is sufficiently urged up against the relevant sidewall.

The skilled person would appreciate that it is not necessary to use a pair of plates to secure the apparatus within the pit. It is possible for the frame to be simply sitting (or else staked, etc.) on the ground surface during the operation of the apparatus. One plate can also suffice in certain circumstances (e.g., where the soil conditions allow for push rod installation without need for much effort—e.g., in friable soil) as the plate securing arrangement is not directly connected to the opposite, corresponding plate as shown in FIG. 1.

Conversely, if greater securing of the apparatus is required, more than two sets of securing arrangement (in this embodiment comprising a strut, an arm, a cable tensioner and a plate) can be used. In an example where three sets of securing means are used, the arms can be arranged so that they extend outwardly from a central part of the frame at substantially equal angles from each other. The arrangement can alternatively be designed so that a third (or further) set is provided to provide securing to a first pair of securing components: the skilled person would be able to devise further variations along this line, in accordance with pit size and shape, ground conditions and so on.

One or more of the plates themselves can comprise a grating or grid or bar capable of being pushed against the sidewalls to secure the apparatus framework (4). The grip of the plates against the sidewalls could be improved by use of engaging projections or teeth or stakes on the plate surface. Plates comprising solid sheets or closely-spaced grating could however help prevent or reduce the effect of the end pit faces or sidewalls collapsing inwards.

There are various advantages to the use of a suspended framework allowing for the apparatus and operative parts to hang into the pit (as opposed to basing it on the pit floor). One is that the moving parts of the apparatus, as well as of the alignment mechanism, are kept away from the dirt and debris at the bottom of the dug pit. Pits and ground conditions of varying conditions and dimensions are accommodated for by the adjustability of the securing or levelling screws arrangement (6) (ground level alignment and depth of the apparatus within the pit) and the tensioners (12).

The main lever arm (23) comprises a shaft (25) and a sleeve or slide tube (20). The shaft is slotted through the slide tube so that it can slide through the slide tube directions in a substantially unencumbered fashion during operation. The slide tube is attached at a first pivot point (21) to a frame plate (14), which is substantially immovably attached to the frame (4). A second, slave lever (16) is pivotably attached at both its ends: at one end to the frame plate at a second pivoting point (18), and at the other end to the main lever at a third pivoting point (22). A supporting web (19) is optionally provided on the frame plate (14) which strengthens the second pivot point (18) and the first pivot point (21). The shaft (25) of the main lever arm (23) extends beyond the length of the slide tube (20) at each end. The shaft terminates in a handle (24) at one end, and at the opposite end it is attached pivotably at the other end (32) to a duct or pipe releasable gripping arrangement (26) which, during use, hangs downwardly from the frame and is located below ground level, i.e., substantially within the pit.

The tube gripping arrangement (26) comprises a set of gripping jaws or clamps (28) which are pivotably connected to an intermediate arm (30) which in turn is pivotably connected to the lower terminating end of the main lever arm as noted above.

In use, an operative located on ground surface level (S) can hold the main lever (23) by its handle (24), to swing the lever arm arrangement back and forth in a reciprocating movement. In other words, the operative need not stand in the pit.

In one implementation, an elongate component such as a push rod or tube (34) is initially installed, which can be used to pull back a standard plastic blown fiber tube or duct. In one embodiment the push tube comprises a simple inexpensive steel tube having a diameter of 12.7 mm, which design seeks to address issues of cost as well as the expected rigidity and pushing forces involved, based on expected soil conditions, operative physical capabilities, and so on. The skilled person would appreciate that other rod or pipe materials and sizes are possible, e.g. between 5 mm and 25 mm diameter, in dependence on configuration of the pushing apparatus, ground conditions, and the like. The tube can be used to pull back a larger duct, or to serve as a duct itself.

The vertical distance of the tube gripping arrangement (26) relative to, e.g., the ground surface (S) can be adjusted using the above-mentioned adjustment means to ensure that the push tube shaft terminating in a nose tip (36) is pointing in the desired level, direction and angle of installation within the ground. In one embodiment, the nose tip is a blunt point so as not to easily pierce other items under the ground, such as other service pipes and cables. More than one push rod or tube can be joined together, e.g., by screwing sections together using a screw-in stud. Ideally, the screw-in stud is of a length which minimizes flexing at the join as the joined sections are being pushed through the ground. In general, unwanted flexing is caused by the stiffness of the joined push tube sections, the straightness of the push tube assembly as it progresses through the ground, as well as the ground soil conditions. These all affect the force exerted against the nose tip of the push tube by the ground, which in turn affects the distance that can be achieved using the pushing apparatus of the invention.

After positioning the shaft of the push rod between the gripping clamp jaw faces, the nose tip is placed through an aperture (40 in FIG. 2B) in the pressure plate (10) against the pit sidewall. Again, care should be taken to ensure that the push rod nose and shaft are correctly positioned, as this will determine the locational accuracy of the installed rod or ducting. Advantageously, the alignment and positioning of the push rod is carried out relative to the ground surface, which is a more reliable and accurate reference point, than using the floor or walls of the dug pit.

To allow a longer push tube/rod to be inserted into a small pit size, and/or to reduce the number of tube/rod sections required for a installation length, a hole (42) can be excavated on the opposite sidewall to accommodate the additional tube length, which is accessed via an aperture (40) through the pressure plate deployed on that side of the pit.

In one implementation, the apparatus is dimensioned to work in a pit of about width 250 mm×length 600 mm×depth 400 mm. As would be appreciated, a smaller pit size has a number of advantages: less digging is required, less dirt is displaced, less heavy digging equipment is needed. The amount of disturbance, both on the ground surface (pathways, roads, existing building and other structures, trees) as well as within the ground itself (in which there may be buried other service cables and tubes, tree roots, and so on) is also correspondingly reduced.

With its suspended arrangement, this embodiment of the pushing apparatus of the invention can advantageously be used with a smaller pit size. The above pit size is selected to allow a standard footway box (e.g., (FB) shown in FIG. 4) used by the applicants to be easily installed by dropping it in the hole after the duct has been installed. The pit size can be even further reduced to a size which would allow just enough room for an engineer to perform work in.

The operative, standing on ground surface level over the pit, starts the installation by swinging the handle back and forth substantially along a plane, to install the rod by pushing it into the ground in a horizontal—or substantially horizontal (e.g., where an angled installation is desired)—direction. A swing of the handle in a first direction (arrow "X") causes the first lever arm to pivot about fulcrum point (32), and the far, lower, end of the first lever arm within the pit swings into the opposite direction (arrow "Y"). At the same time, the second, slave, lever arm (16) is caused to pivot about point (18).

The main lever (23 via slide tube 20) and the slave lever (16) operating off the two pivot points (18 and 21) on frame plate (14) causes the loci of pivot point (32) to follow a part of an ellipse which curve is set by the distance between the two frame plate pivot points (18 and 21). This path is substantially "flatter" or more linear than the curved path followed by the other handle end (24) of the shaft.

Figure 5:
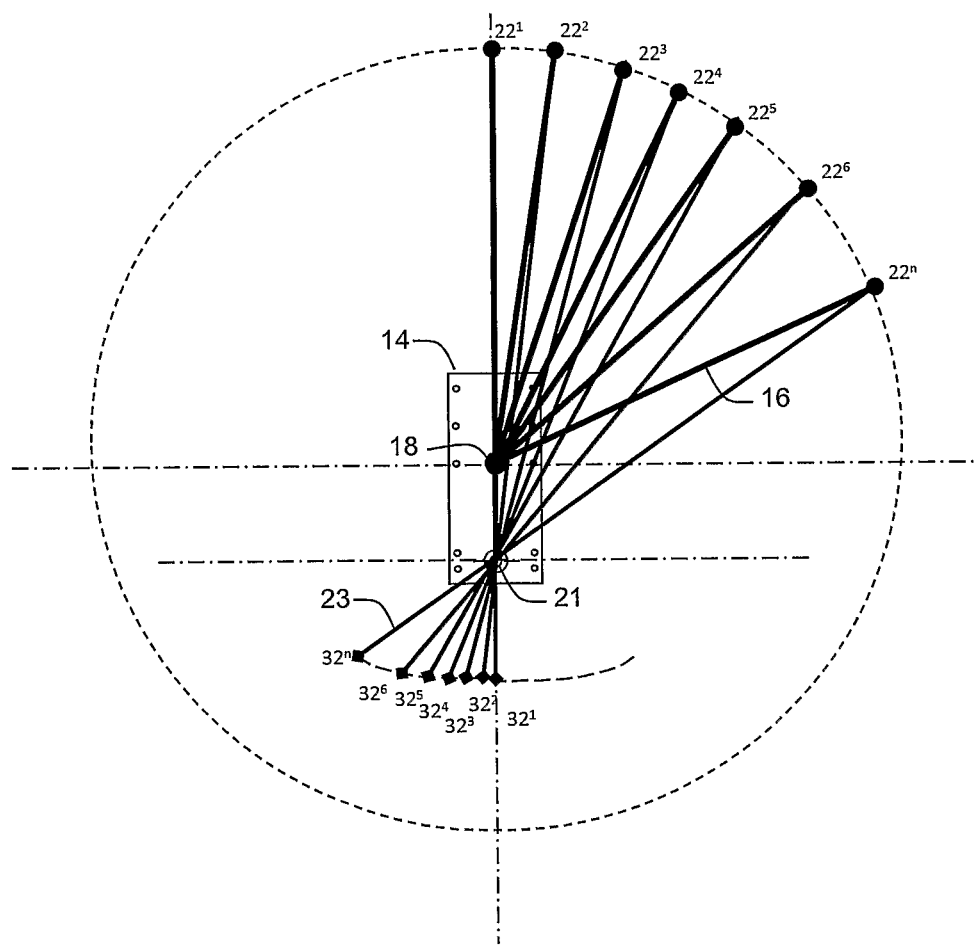
FIG. 5 is a schematic representation of the operation of the duct pushing apparatus.

A diagrammatic representation of the operation of the two lever arms is shown in FIG. 5. In this drawing, the first pivot point (21) and the second pivot point (18) are represented being attached on to the frame plate (14). As explained above, the slide tube (20) of the main lever (23) is attached to the frame plate (14) via the first pivot point (21). The slave lever is attached to the frame plate via the second pivot point (18). The third pivot point (22) (which connects the slave lever to the shaft of the main lever) is represented in this drawing in motion as a series of points ($22^1$, $22^2$, . . . $22_n$) along the circumference of an arc. The other end (32) of the main lever to which the gripping arrangement (26) is attached is also represented in motion as a series of points ($32^1$, $32^2$, . . . $32^n$) along a path which describes a more linear, less curved path than that followed by the third pivoting point (22). The translation of the applied force causing the upper section of shaft of the main lever to follow a curved path, so that the opposite end of the shaft follows a less-curved, more linear path, will now be described.

In this illustration, the operative commences operation with the main lever (23) in a substantially upright position so that the third pivoting point is at position ($22^1$). The shaft (20) of the main lever is then pushed or pulled by the operative, for example via its handle (24) to a second position ($22^2$). This causes the slave lever (16) to pivot at each end at the second and the third pivoting points (18 and 22). It also causes the shaft to pivot about the first pivoting point (21) via the sleeve or slide tube (20), so that it slides through the slide tube (20) resulting in the gripping apparatus (26) moving in the general direction ("Y") of installation of the push rod. When the handle is caused to move in the opposite direction to the above, the shaft slides upwardly through the tube slide so that the gripping arrangement moves opposite to the direction of push rod installation.

Thus, the combined effect of movement about the three pivoting points as the third pivot point (22) moves through from position ($22^1$) to position ($22_n$), results in the movement of the end of the main lever which holds the gripping arrangement (26) along a path which is substantially linear and significantly less arcuate than that followed by the handle of the main lever.

The configurations of the two pivoting points (18 and 21) can be seen from the front-on and side views of the frame plate (14) in FIG. 2C. In embodiments, the loci of pivot position (32) permits the double lever or fulcrum arrangement over the various pivoting points to enable substantially linear push rod installation and substantially avoids curving the path taken by the tube.

This may be contrasted with manual installation devices of the prior art, which use a single lever arm pivotably connected to a frame usually at a single point. Swinging the handle of such one-lever arm machines through an arc about its fulcrum will have the expected effect of causing the opposite lever arm end to move in a corresponding arc. Predictably, the tube gripping component located at this opposite end will tend to push (or pull) the push tube through an arc. This of course interferes with the tube installation (or removal) process in that the depth of the tube as it progresses through the ground changes with distance. To cope with this, prior art apparatus use guides and other structural elements to force the tube away from the naturally arcuate path and along the desired linear path. As noted briefly above, such additional components add complexity and are possible points of failure—especially with the amount of grit and dirt that may be expected in such an operational environment.

Operation of the duct gripping arrangement (26), whereby the jaws are opened and closed in succession by each swing of the main lever (23), is effected by the reciprocal action of the lever arms operating on the pivot points (18, 21 and 22). The pulling force in direction "X" from the main lever arm (23) via the pivot point (32) closes the jaw or clamps, while force in the opposite direction on the main lever (23) via the pivot point (32) will open the clamp. With a push rod (or a pipe or duct) (34) between the jaws of the gripping arrangement (26), application of force in direction "X" will close the clamps (28) on the external surface of push rod, so that the push rod is engaged and pushed into the sidewall of the pit in direction "Y". When the operative changes the swing to the opposite direction of arrow "X", resulting in the opening of the clamp jaws (28). The release of the push rod results in its remaining in position where it is at least partially embedded in the sidewall of the pit. In the meantime, the clamps (28) are caused to move in their open position along the length of the push rod as the main lever (23) is swung opposite to direction "X"; when the operative changes direction to "X" again, the clamp jaws close on a fresh section of the push rod which is rearward of direction "Y". The above-described pushing action re-commences, and alternates with the above push rod-release action until the push rod is installed by its substantially full burial within the sidewall of the pit.

The skilled person would appreciate that a number of possible alternatives exist to implement the above: for example, a simple grip/release mechanism can be provided in the vicinity of the main lever (23) to allow the operative to manually control the corresponding grip/release action of the gripping clamp jaws on the tube.

In one embodiment, the faces of tube gripping jaw (28), which in use engage with the push rod or tube, are configured so that there is a significant amount of surface area in contact with the surface of the push tube. In the embodiment shown in FIG. 1, the gripping clamps comprise elongated bars which extend along the longitudinal axis of the push tube. This configuration reduces the possibility of imparting a crushing force (which can occur upon the application of high force on the lever arms) concentrated on a relatively small section of the push tube so as to harm it; instead the clamping force is distributed over a wide area of the tube. The center of the push tube/rod (34) is aligned with the pivot point (32). The gripping jaws (28) being placed some distance behind the pivot point (32) in the direction of force means the force is applied through the center of the push rod/tube (32) in the desired direction, and reluctance to rotation at pivot point (32) is overcome. This helps maintain the progress of the tube along the trajectory desired by the operative as it is pushed along. This is because there is less scope for the tubes to pivot about the point at which it is gripped, while it is being push-installed.

As noted above, the tube gripping arrangement (26) is attached to one terminal end of the main lever arm (23) at pivoting point location (32). In one embodiment, the pivot is configured to allow for the grip arrangement to turn about at least 180°. In other words, the gripping arrangement (26) can be completely re-configured to enable a push tube or the like to be pulled out from, e.g., the sidewall of the pit. The clamp jaws (28) will release and open on the operative's push on the main lever (23) in the direction "X" (instead of gripping and closing), and grip or close on a swing in the opposite direction. This change in installation direction can be easily realized by the simple expedient of flipping the gripping arrangement around the fulcrum point (32) without need for removing and refitting parts of the apparatus, from a "push" installation position to a "pull" installation position. Upon turning the tube gripping arrangement around, the push rod may then be inserted between the gripping clamps, and swinging the main lever back and forth in the usual manner. The apparatus of the invention may be used to install ducts, tubes, pipes and the like within holes provided by other methods (e.g., by moling) in this manner.

In tests, the applicants have been able to achieve installation rates of 12 meters of push tube in about 10 minutes in moderate soil conditions at an installation depth of between 250 mm to 400 mm. (This time excludes set up and pit-digging time.)

Figure 3:
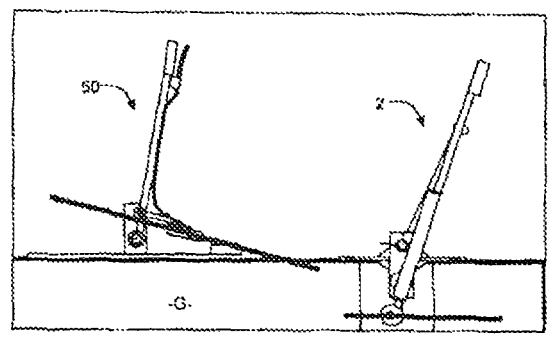
FIG. 3 is a schematic view of use of the duct pushing apparatus in conjunction with a surface duct pushing apparatus.
Figure 4:
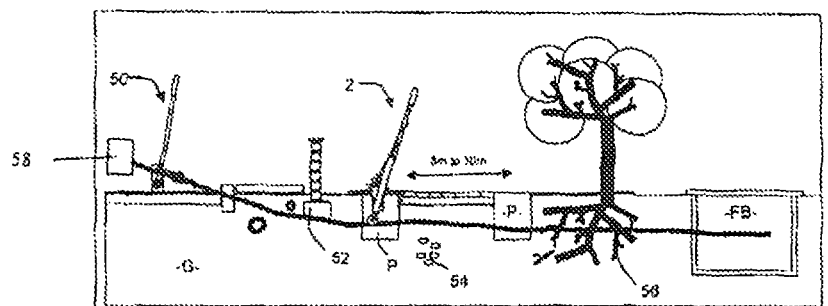
FIG. 4 illustrates use of the duct pushing apparatus and an angled surface installation device.

Turning now to FIGS. 3 and 4, the linear pushing/pulling apparatus (2) is shown in use together with an angled "surface" installation device (50). The apparatus is fully adapted to use on its own in the manner suggested in FIG. 1, wherein a trench or pit is dug and a push rod or tube installed in the way described above.

By using an angled surface installer, the push rod can be initially "launched" from the surface at, e.g., 10° to the ground level, and upon the push tube reaching a certain predetermined depth and distance from the launch site (as detected using, e.g., radio-based metal detection methods), the linear push/pull apparatus (2) of the apparatus can continue the installation process by changing the push tube installation angle (e.g., as shown in FIG. 3, where the tube is re-aligned or "straightened" to run more parallel to the ground surface) or direction (e.g., in FIG. 4, illustrating possible obstacles like a wall (52) having a foundation sunk into the ground, underground stones and rocks (54), tree roots (56) and the like). Some obstacles will need, e.g., percussive power to get through (e.g., wall foundations), while others may be flexibly pushed through (tree roots). The hand-powered installation tool provides the operative feedback about the nature of the obstacle through the touch of the lever handle—the extent and "feel" of any resistance in particular will allow the operative to make the necessary decisions about how best to overcome the problem.

Thus there can be advantages to using both installation devices (2 and 50) together in certain scenarios and in certain soil conditions as this allows for greater flexibility in deployment, although there will be other situations where use of one or the other alone might yield improved results.

In a typical installation at the customer end of the access network (i.e., at the curb, cabinet, or the customer's premises), the operative's tool kit would include:
  The linear push tube installation apparatus
  Optionally, an angled surface push tube "launcher"
  Pre-threaded sections of 12.7 mm diameter steel push tube and connector threaded joining pieces
  Spade and other pit digging equipment
  Spirit level (for ensuring that the installation apparatus is installed in a level manner, regardless of any incline of the ground surface, and for levelling out the push rods prior to installation)
  Survey equipment (for locating the piping and cabling of other services, and the position and depth of the push tube installation during use)
  Alignment equipment levels and sighting pole and sight
  Pull back adaptor and final duct, and optical fiber pipe to be installed.

After successful installation of the push rod or tube, or after the pull back of any standard optical fiber tube, optical fiber may be blown through the installed tube in the conventional manner, using a blowing head (58) at one end of the installed optical fiber tube.

The skilled person would appreciate that although the above description is provided in the context of optical fiber and specifically blown fiber, that the apparatus and methods are equally applicable to the installation (and removal by pulling out) of piping, tubing, ducting or the like for any purpose, such as those of utility suppliers such as gas, water or electricity, cable television, ground heat extraction. The application of the invention is also not confined to the access network or points near the customer end—the tubes to be installed can be located anywhere within a network or otherwise of ducting. It would also be possible to use the apparatus and methods described herein in conjunction with conventional methods, e.g. to create a small bore as an initial guide or to pull back larger-diameter duct; or to initially create a small bore which can be subsequently enlarged by using a pressure nozzle or pressure jet or vibration. Such known methods could also be used to augment the push distance achievable using the present hand-powered tool, or to remove blockages encountered during the installation session.

The methods, devices and configurations described above and in the drawings are for ease of description only and not meant to restrict the invention to any particular embodiments. It will be apparent to the skilled person that various components, devices and permutations on the methods and devices described are possible within the scope of this invention as disclosed. Similarly the invention could be deployed in a variety of contexts to realize the advantages afforded by its use. The skilled person would also appreciate that a number of variations may be made to the precise location and configuration and materials used for the components and parts making up the apparatus, that would be within the scope of the inventive concept. For example, the positioning of the various pivoting points depend on the expected diameter of the push rod or tube to be used. The absolute length of the lever arms is of less relevance than their length relative to each other. The apparatus need not wholly be operated on manual power alone. In alternative embodiments, detectors can be fitted at the tip or elsewhere along the push rod to help with the detection of power and metal which may indicate underground pipes and cables of other services. It will also be possible to include a transmitter in the same way, which is capable of responding to the surface detection of the location and depth of the push rod or tube.

The invention claimed is:
1. Apparatus for moving an elongate component within or through one of a plurality of sidewalls of a pit, comprising:

a gripping arrangement for releasably gripping the elongate component when moving the elongate component within or through one of a plurality of sidewalls of the pit;

an elongate lever arrangement comprising a first section and a second section with a fulcrum arrangement therebetween and having a handle at an outer end of the first section and the gripping arrangement at an outer end of the second section;

a frame to which the fulcrum arrangement of the lever arrangement is directly and pivotally attached;

supports attached to each end of the frame; and wherein during use the frame is positioned over the pit and the supports secure the frame on the ground surface on each side of the pit, and as an operator rocks the first section backwards and forwards by way of the handle, the gripping arrangement hangs downwardly from the frame into the pit and is correspondingly urged forwards and backwards by the second section.

2. Apparatus according to claim 1, further including a frame securing arrangement for securing a position of the frame relative to the pit.

3. Apparatus for moving an elongate component within or through one of a plurality of sidewalls of a pit, comprising:

a gripping arrangement for releasably gripping the elongate component when moving the elongate component within or through one of a plurality of sidewalls of the pit;

a lever arm comprising a handle at a first end and the gripping arrangement at a second end;

a frame to which the lever arm is attached;

supports attached to each end of the frame; and a frame securing arrangement for securing a position of the frame relative to the pit comprising a securing arm attached to the frame at a first end, and to a securing plate at a second end, wherein during use the securing plate is secured under tension against one of the plurality of sidewalls by the securing arm, wherein during use the frame is positioned over the pit and the supports secure the frame on the ground on each side of the pit, and the gripping arrangement hangs downwardly from the frame into the pit.

4. Apparatus according to claim 3, wherein the frame securing arrangement comprises a plurality of securing arms each being attached to the frame at a first end, and to a securing plate at a second end, and wherein during use each securing plate is secured under tension to a different one of the plurality of sidewalls by its securing arm.

5. Apparatus according to claim 4, wherein each securing plate comprises a solid sheet.

6. Apparatus according to claim 5, wherein at least one of the securing plates has an aperture for allowing the elongate component to pass.

7. Apparatus according to claim 3, wherein the securing arm comprises a component which at least one of either its length, or tension along its length, is adjustable.

8. A method of pushing an elongate component into or through one of a plurality of sidewalls of a pit, comprising:

digging a pit;

positioning an apparatus over the pit, the apparatus comprising a gripping arrangement for releasably gripping the elongate component, a lever arm comprising a handle at a first end and the gripping arrangement at a second end, and a frame to which the lever arm is attached, and supports attached to each end of the frame, positioning the frame substantially over the pit with the gripping arrangement hanging downwardly from the frame into the pit;

securing the frame with the supports on the ground on each side of the pit;

swinging the handle of the lever arm in a first direction to cause the gripping arrangement and the elongate component gripped therein to move in a direction opposite the first direction and to push the elongate component into the one of the plurality of sidewalls; and swinging the handle of the lever arm in the direction opposite the first direction to cause the gripping arrangement to move in the first direction and to release the elongate component from the gripping arrangement.

9. A method of pulling an elongate component from one of a plurality of sidewalls of a pit, comprising;

digging a pit;

positioning an apparatus over the pit, the apparatus comprising a gripping arrangement for releasably gripping the elongate component, a lever arm comprising a handle at a first end and the gripping arrangement at a second end, and a frame to which the lever arm is attached, and supports attached to each end of the frame, positioning the frame substantially over the pit with the gripping arrangement hanging downwardly from the frame into the pit;

securing the frame with the supports on the ground on each side of the pit;

swinging the handle of the lever arm in a first direction to cause the gripping arrangement and the elongate component gripped therein to move in a direction opposite the first direction and to pull the elongate component from the one of the plurality of sidewalls; and swinging the handle of the lever arm in the direction opposite the first direction to cause the gripping arrangement to move in the first direction and to release the elongate component from the gripping arrangement.

\* \* \* \* \*